United States Patent [19]

Tayloe

[11] Patent Number: 5,920,803
[45] Date of Patent: *Jul. 6, 1999

[54] METHOD AND APPARATUS FOR MESSAGE DELIVERY IN A COMMUNICATION SYSTEM HAVING ORBITING TRANSMITTERS

[75] Inventor: Daniel Richard Tayloe, Phoenix, Ariz.

[73] Assignee: Motorola, Inc., Schaumburg, Ill.

[*] Notice: This patent is subject to a terminal disclaimer.

[21] Appl. No.: 08/967,231

[22] Filed: Oct. 29, 1997

Related U.S. Application Data

[63] Continuation of application No. 08/523,421, Sep. 5, 1995, abandoned.

[51] Int. Cl.⁶ .................................................. H04B 7/185
[52] U.S. Cl. ........................ 455/12.1; 455/67.3; 455/429; 455/522
[58] Field of Search .............................. 455/12.1, 8, 13.1, 455/3, 13.2, 10, 13.3, 429, 430, 63, 67.3, 427, 456, 517, 522, 562, 458

[56] References Cited

U.S. PATENT DOCUMENTS

| | | | |
|---|---|---|---|
| 5,153,902 | 10/1992 | Buhl et al. ................................. | 379/57 |
| 5,274,845 | 12/1993 | Wang ...................................... | 455/33.1 |
| 5,343,512 | 8/1994 | Wang et al. ............................ | 455/12.1 |
| 5,369,681 | 11/1994 | Boudreau et al. ......................... | 379/59 |
| 5,375,161 | 12/1994 | Fuller et al. ............................... | 379/57 |
| 5,404,569 | 4/1995 | Schwendeman et al. .............. | 455/13.1 |
| 5,423,084 | 6/1995 | Vatt ....................................... | 455/13.1 |
| 5,483,664 | 1/1996 | Moritz et al. .......................... | 455/12.1 |
| 5,504,938 | 4/1996 | Redden .................................. | 455/12.1 |
| 5,537,681 | 7/1996 | Redden et al. .......................... | 455/12.1 |
| 5,551,058 | 8/1996 | Hutcheson et al. ..................... | 455/33.2 |
| 5,561,836 | 10/1996 | Sowles et al. .......................... | 455/12.1 |
| 5,566,354 | 10/1996 | Sehloemer .............................. | 455/12.1 |
| 5,603,079 | 2/1997 | Olds et al. .............................. | 455/13.2 |
| 5,689,803 | 11/1997 | Tayloe .................................... | 455/12.1 |

*Primary Examiner*—Andrew I. Faile
*Assistant Examiner*—Aung S. Moe
*Attorney, Agent, or Firm*—Dana B. LeMoine

[57] ABSTRACT

A communication system (10), having dynamic nodes such as satellites (12) communicate information from a calling party to a called party or subscriber unit (26). When adjacent interfering structures (100) obstruct a communication path, information is unable to pass therebetween. A message control center (27) allows a caller to leave a message for subsequent delivery to a subscriber unit (26). Message control center (27) calculates an enhanced delivery region (105) about a last-know location of subscriber unit (26) and determines satellite orbits that pass over the enhanced delivery region. This enhanced delivery region is serviced by satellites passing at near overhead elevation angles. Message control center (27) prioritizes the ground-tracks contained within an enhanced delivery region (105) and selects one for use in message delivery. A delivery time is calculated corresponding to the selected ground-track and message control center (27) schedules delivery of that message. Message control center (27) attempts to transmit a message as schedule to subscriber unit (26).

7 Claims, 6 Drawing Sheets

METHOD AND APPARATUS FOR MESSAGE DELIVERY IN A COMMUNICATION SYSTEM HAVING ORBITING TRANSMITTERS

This application is a continuation of prior application Ser. No. 08/523,421 filed Sep. 5, 1995, now abandoned.

FIELD OF THE INVENTION

The present invention relates generally to satellite-based communications, and, more particularly, to reliable transmission of messages from diverse transmitters in a heavily obstructed area such as an urban environment.

BACKGROUND OF THE INVENTION

Delivery of messages in a communication system requires conducive propagation characteristics to effectuate reception of a transmitted message. Many communication systems allow a caller to attempt to place a call to a subscriber without having consideration for the present configuration of system elements, such as transmitters, in relationship to the proposed addressee or called party.

In such systems, a connection is attempted between a caller and a called party or subscriber. When a connection is established due to a conducive configuration between the parties, then communication proceeds. However, when communication parameters are non-conducive to successful communication, a called party does not receive its message. This non-conducive configuration between a calling party and a called party may be due to a less desirable present configuration of a message transmitter. Such less conducive configurations is aggravated in urban environments where interfering structures are prevalent.

Many communication systems allow a calling party to dictate a message for subsequent delivery to the called party. Systems that provide for such delivery store a message, either of voice or data, and attempt to deliver the message at a subsequent point in time. Some systems store a message and re-attempt to establish communication at a fixed-delay in time. Such an unsophisticated re-attempt often leads to a similar non-conductive configuration of system transmitters with the called party.

Other systems do not re-attempt to establish communication but instead store the message until the called party subsequently interacts with the communication system. The message is then delivered to the called party. Such a message delivery system unnecessarily delays the delivery of the message when communication-conducive configurations between a called party and the system may have occurred earlier than when the message was eventually delivered.

Thus, what is needed is a message delivery system capable of determining a more optimal subsequent configuration between the communication system and the called party, therefor, facilitating delivery of a message to a called party.

DESCRIPTION OF THE PREFERRED EMBODIMENT

Figure 1:
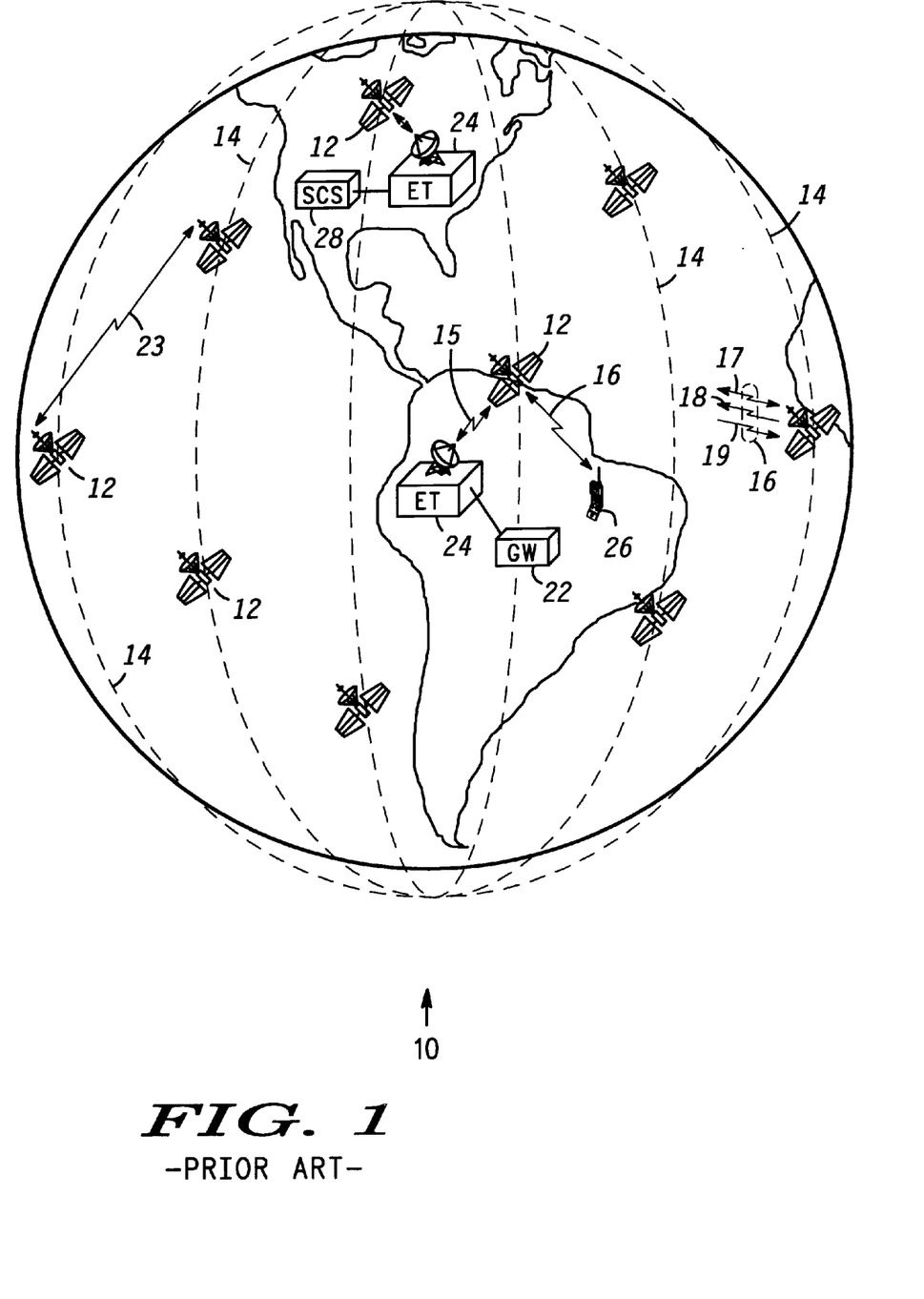
FIG. 1 depicts a highly simplified diagram of a satellite-based communication system of which the present invention may form a portion thereof.

FIG. 1 depicts a highly simplified diagram of a satellite-based communication system 10, dispersed over and surrounding earth through use of orbiting satellites 12 occupying orbits 14. The present invention is applicable to communication systems including satellites having low-earth and medium-earth orbits. Additionally, it is applicable to orbits having any angle of inclination (e.g., polar, equatorial or another orbital pattern).

Communication system 10 uses six polar orbits 14, with each orbit 14 having eleven satellites 12 for a total of sixty-six satellites 12. Although this is preferred, it is not essential because more or fewer satellites, or more or fewer orbits, may be used. While the present invention is advantageously employed when a large number of satellites are being used, it is also applicable with as few as a single satellite. For clarity, FIG. 1 illustrates only a few of satellites 12 of the constellation.

For example, each orbit 14 encircles earth at an altitude of around 785 km, although higher or lower orbital altitudes may be usefully employed. Due to the relatively low orbits of satellites 12, substantially line-of-sight electromagnetic (e.g., radio, light etc.) transmission from any one satellite 12 or reception of signals by any one satellite 12 covers a relatively small area of earth at any instant. For the example shown, satellites 12 travel with respect to earth at around 25,000 km/hr, allowing satellite 12 to be visible to a terrestrial station or SUs 26 for a period of approximately nine minutes.

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22 which provide access to a public switched telephone network (PSTN) or other communications facilities. Only one each of GWs 22, SCSs 28 and SUs 26 are shown in FIG. 1 for clarity and ease of understanding. ETs 24 may be co-located with or separate from SCS 28 or GW 22. ETs 24 associated with SCSs 28 receive data describing status of satellites 12 and GWs 22 and relay packets of control information. ETs 24 associated with GWs 22 primarily receive and relay packets relating to calls in progress from/to SUs 26 and satellites 12.

SUs 26 may be located anywhere on the surface of the earth or in the atmosphere above the earth. SUs 26 are preferably communications devices capable of transmitting data to and receiving data from satellites 12. By way of example, SUs 26 may be hand-held, portable cellular telephones adapted to communicate with satellites 12. Ordinarily, SUs 26 need not perform any control functions for communication system 10.

Communication system 10 may accommodate any number, potentially in the millions, of SUs 26. In the preferred embodiments of the present invention, SUs 26 communicate with nearby satellites 12 via subscriber links 16. Links 16 encompass a limited portion of the electromagnetic spectrum that is divided into numerous channels. Links 16 are preferably combinations of L-Band and/or K-Band frequency channels and may encompass Frequency Division Multiple Access (FDMA) and/or Time Division Multiple Access (TDMA) and/or Code Division Multiple Access (CDMA) communications or combinations thereof. At a minimum, satellite 12 regularly transmits over one or more broadcast channels 18. SUs 26 synchronize to broadcast channels 18 and monitor broadcast channels 18 to detect data messages which may be addressed to them. SUs 26 may transmit messages to satellites 12 over one or more acquisition channels 19. Broadcast channels 18 and acquisition channels 19 are not dedicated to any one SU 26 but are shared by all SUs 26 currently within view of a satellite 12.

On the other hand, traffic channels 17 are two-way channels that are assigned to particular SUs 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, at a minimum, a two-way voice conversation. To support real-time communications, a time division multiple access (TDMA) scheme is desirably used to divide time into frames, preferably in the 10–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a number of independent calls. Those skilled in the art, however, will recognize that traffic channels can be formed without this time slot structure and that methods that do not require digitizing the analog voice signal may be employed. The precise method used to form the channels and process the voice communication is not important to this invention.

Satellites 12 communicate with other nearby satellites 12 through crosslinks 23. Thus, a call or communication from a SU 26 located at any point on or near the surface of the earth may be routed through the constellation of satellites 12 to within range of substantially any other point on the surface of the earth. A communication may be routed down to a SU 26 on or near the surface of the earth from a satellite 12 using subscriber link 16. Alternatively, a communication may be routed down to or up from any of many ETs 24, of which FIG. 1 shows only two, through earth links 15. ETs 24 are usually distributed over the surface of the earth in accordance with geo-political boundaries. In the preferred embodiments, each satellite 12 may communicate with up to four ETs 24 and over a thousand SUs 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communication systems, such as the PSTN, may access communication system 10 through GWs 22.

A message control center 27 (FIG. 4) may be contained within an SCS 28 or GW 22 for performing enhanced messaging services. Such services occur when a called party dictates a message to a message control center which is stored therein for delivery to the called party such as an SU 26. In the preferred embodiment, message control center calculates the orbits of satellites 12 in relation to SU 26 and performs the methods as described in FIGS. 5–7 for selecting a more optimal message delivery time for increasing the probability that a message will successfully be delivered to SU 26.

With the example constellation of sixty-six satellites 12, at least one of satellites 12 is within view of each point on the earth's surface at all times, resulting in full coverage of the earth's surface. Any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to satellite constellations where full coverage of the earth is not achieved (i.e., where there are "holes" in the communications coverage provided by the constellation) and constellations where plural coverage of portions of the earth occur (i.e., more than one satellite is in view of a point on the earth's surface).

In general terms, communication system 10 may be viewed as a network of nodes. Each satellite 12, GW 22, and SU 26 represents a node of communication system 10. All nodes of communication system 10 are or may be in data communication with other nodes of communication system 10 through communication links 15, 16, and/or 23. In addition, all nodes of communication system 10 are or may be in data communication with other telephonic devices dispersed throughout the world through PSTNs and/or conventional terrestrial cellular telephone devices coupled to the PSTN through conventional terrestrial base stations.

Figure 2:
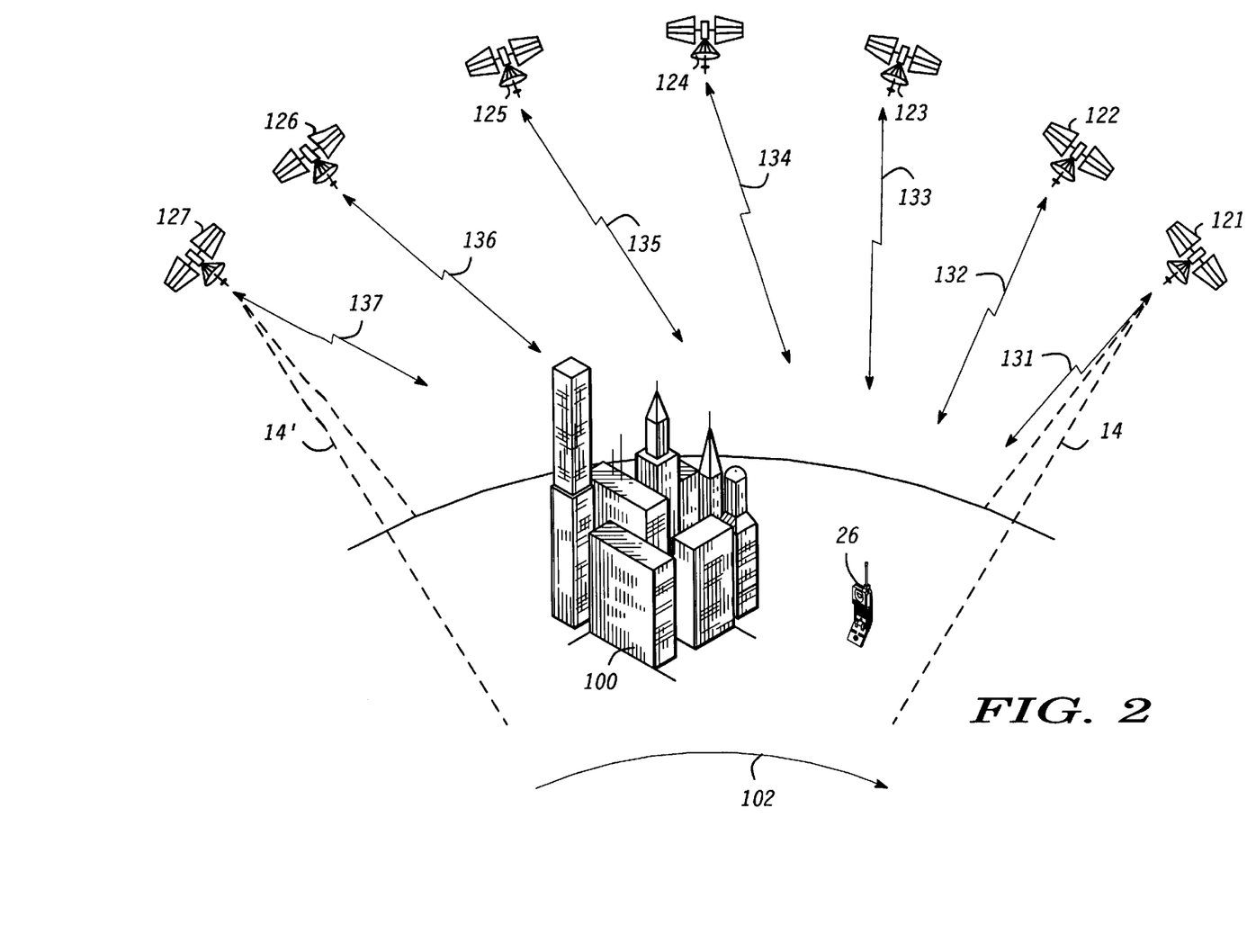
FIG. 2 depicts communication paths between an orbiting satellite and a subscriber unit, in accordance with an embodiment of the present invention.

FIG. 2 depicts communication paths between an orbiting satellite 12 and a subscriber unit 26, in accordance with an embodiment of the present invention. Satellites 12 circle the Earth in orbit 14 and the Earth precesses or rotates under the constellation of satellites 12 in direction 102. As satellites 12 continue in orbit 14, at one point in time, satellite 12 maintains a satellite position 121 wherein satellite 12 possesses a communication path 131 with respect to SU 26.

As the Earth precesses in direction 102, either a subsequent satellite 12 in orbit 14 or the same satellite 12 will occupy satellite position 122 and possess a communication path 132 with respect to SU 26. In the preferred embodiment, satellites 12 repeat their incremental advance over and past SU 26 with satellite positions 123–127 and displaying communication paths 133–137 in relation to SU 26. When the Earth has rotated to a point where satellite 12 has advanced to satellite position 127, orbit 14 then appears in relation to SU 26 as shown by orbit 14'.

Interfering structure 100 when adjacent to SU 26 disrupts communication paths 136 and 137 from respective satellite positions 126 and 127. Such adjacent interfering structures 100 hinder reliable message delivery between satellites 12 and SU 26. In the preferred embodiment, communication system 10 (FIG. 1) would avoid attempting to transmit a message to SU 26 during satellite positions 126 and 127.

Figure 3:
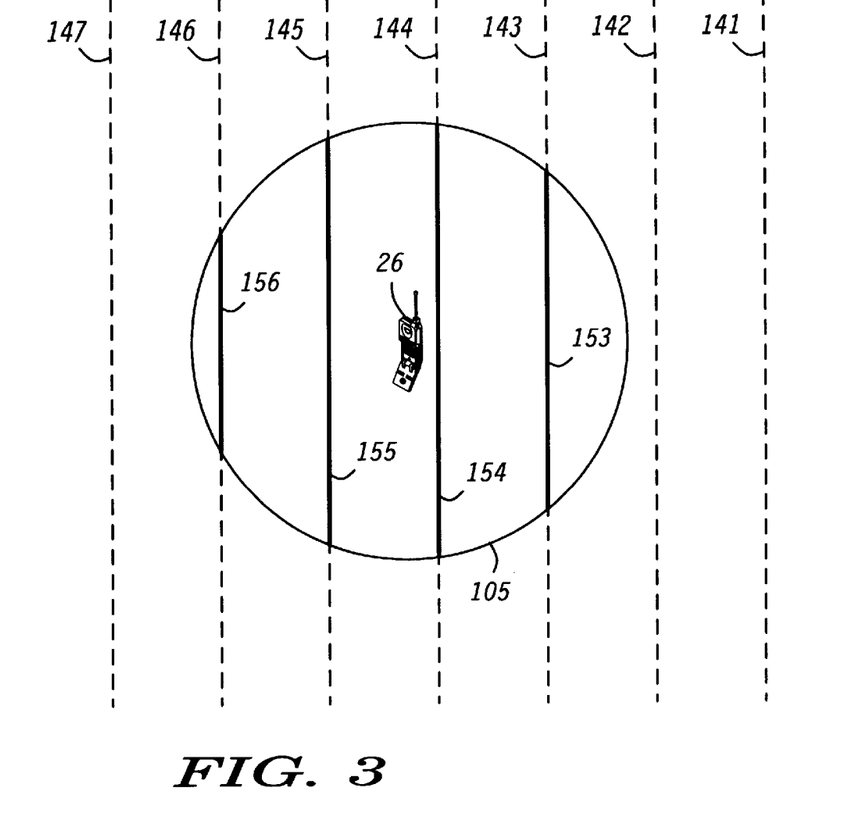
FIG. 3 depicts topographical view of precessing orbits of an orbiting satellite as projected around a subscriber unit, in accordance with the present invention.

FIG. 3 depicts topographical view of precessing orbits of an orbiting satellite as projected around a subscriber unit, in accordance with the present invention. Each of satellites 12 while orbiting the Earth and occupying satellite positions 121–127 (FIG. 2) projects a satellite orbit ground-track 141–147, respectively, about SU 26. Generation of satellite orbit ground-tracks are well known in the art and basically a projection upon the surface of the Earth of a ray from an orbiting satellite 12 directed at the center of the Earth.

Satellite orbit ground-tracks appearing tangentially further from SU 26, such as satellite orbit ground-tracks 141, 142, 146 and 147 are nearer to the tangential horizon in relation to SU 26. Such low-horizon angles are more susceptible to structural blockage or interference from interfering structures 100 (FIG. 2). In the preferred embodiment of the present invention, an enhanced delivery region 105 is defined wherein high-horizon or "near-overhead" communication paths are used as message delivery opportunities.

Portions of near-overhead satellite orbit ground-tracks are also omitted as message transmission windows when they are also low in their respective horizons. Satellite orbit ground-tracks calculated to fall within enhanced delivery region 105 are denoted as enhanced delivery ground-tracks 153–156. Satellites 12 when projecting ground-tracks falling within enhanced delivery region 105, appear high in the horizon with respect to SU 26. Such a satellite position minimizes potential interference of blockage from an interfering structure such as a building or foliage.

Enhanced delivery ground-tracks 153–156 also exhibit varying dwell times within enhanced delivery region 105. Enhanced delivery ground-tracks 153–155 are shown to provide a favorable communication path for a longer duration than enhanced delivery ground-track 156. Longer dwell times within enhanced delivery region 105 are more conducive for delivery of longer messages. In a preferred embodiment of the present invention, dwell times within enhanced delivery region 105 are evaluated for selecting enhanced delivery ground-tracks having a sufficient duration to completely deliver a message.

In yet another preferred embodiment, alternate enhanced delivery ground-tracks may be denoted for a subsequent re-attempt at establishing communication with SU 26.

Figure 4:
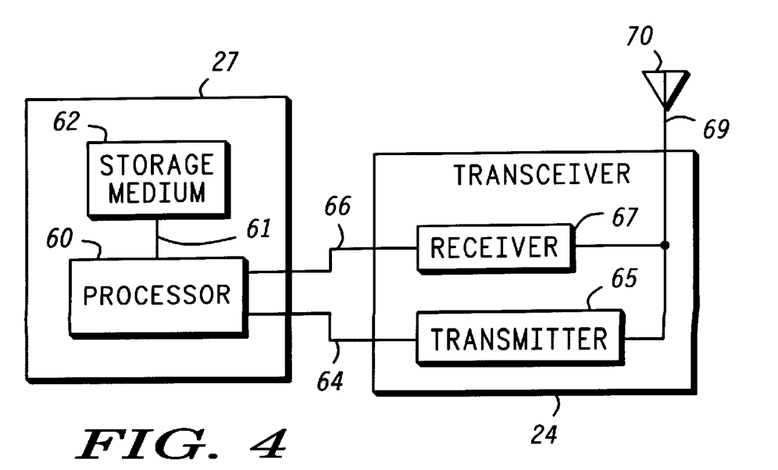
FIG. 4 is a simplified block diagram of a message control center with an earth terminal, in accordance with the present invention.

FIG. 4 is a simplified block diagram of a message control center 27 with an earth terminal 24, in accordance with the present invention. Message control center 27 is desirably part of SCS 28 or GW 22 (FIG. 1). Message control center 27 comprises processor 60 coupled to associated storage medium 62 (e.g., random access memory or RAM, other semiconductor or magnetic read-write memory devices, optical disk, magnetic tape, floppy disk, hard disk etc.) via link 61. Earth terminal 24 includes antenna 70 coupled to transmitter 63 and receiver 67 via link 69. Transmitter 63 and receiver 67 are coupled to processor 60 via links 64 and 66, respectively. Processor 60 desirably carries out procedures exemplified below and described in the associated text. For example, in addition to performing other tasks as appropriate, processor 60 desirably stores results from such procedures in storage medium 62. Transmitter 63 and/or receiver 67 transmit messages to and/or receive messages from satellites 12.

Processor 60 generally controls and manages message reception, calculation of message delivery and transmission, channel set-up, radio tuning, frequency and time slot assignment, and other cellular radio communication and control functions. Among other things, processor 60 desirably executes procedures to allow a calling party or caller to leave a message to be delivered to a called party or subscriber of communication system 10 (FIG. 1).

Figure 5:
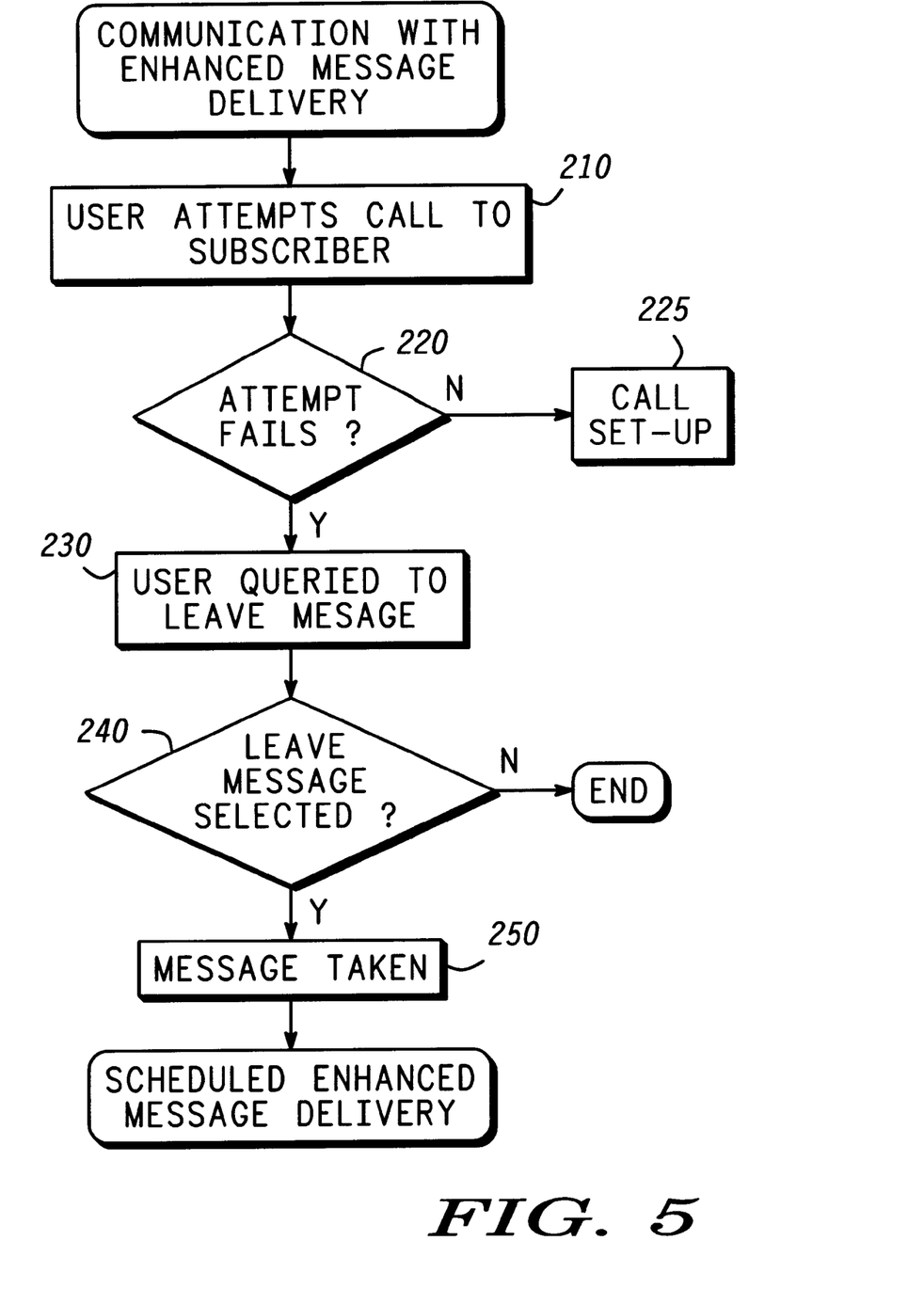
FIG. 5 is a flowchart of a failed communication attempt wherein enhanced messaging services are provided, in accordance with the present invention.

FIG. 5 is a flowchart of a failed communication attempt wherein enhanced messaging services are provided, in accordance with the present invention. In a task 210 a user or calling party initiates a call to a subscriber or called party. A user may be part of a user community within communication system 10 (FIG. 1) or an outside user accessing services provided by communication system 10.

In a query task 220, a determination is made as to whether the communication attempt was successful in locating a subscriber. If the attempt did not fail, then a task 225 commences which establishes a communication link between the user and the subscriber.

A task 230 commences when a call attempt fails and communication system 10 is unable to establish a communication path between a user and a subscriber. Task 230 queries a user to leave a message. The message may be of a variety of data types such as voice or data.

A query task 240 determines if a user selected the option of posting a message. If a user elects not to leave a message, then processing terminates and no further evaluation of a subscriber's status is necessary.

A task 250 is performed when a user elects to leave a message for a subscriber. Task 250 records the message and stores it for subsequent delivery to the designated subscriber. Processing then passes to schedule the message delivery.

Figure 6:
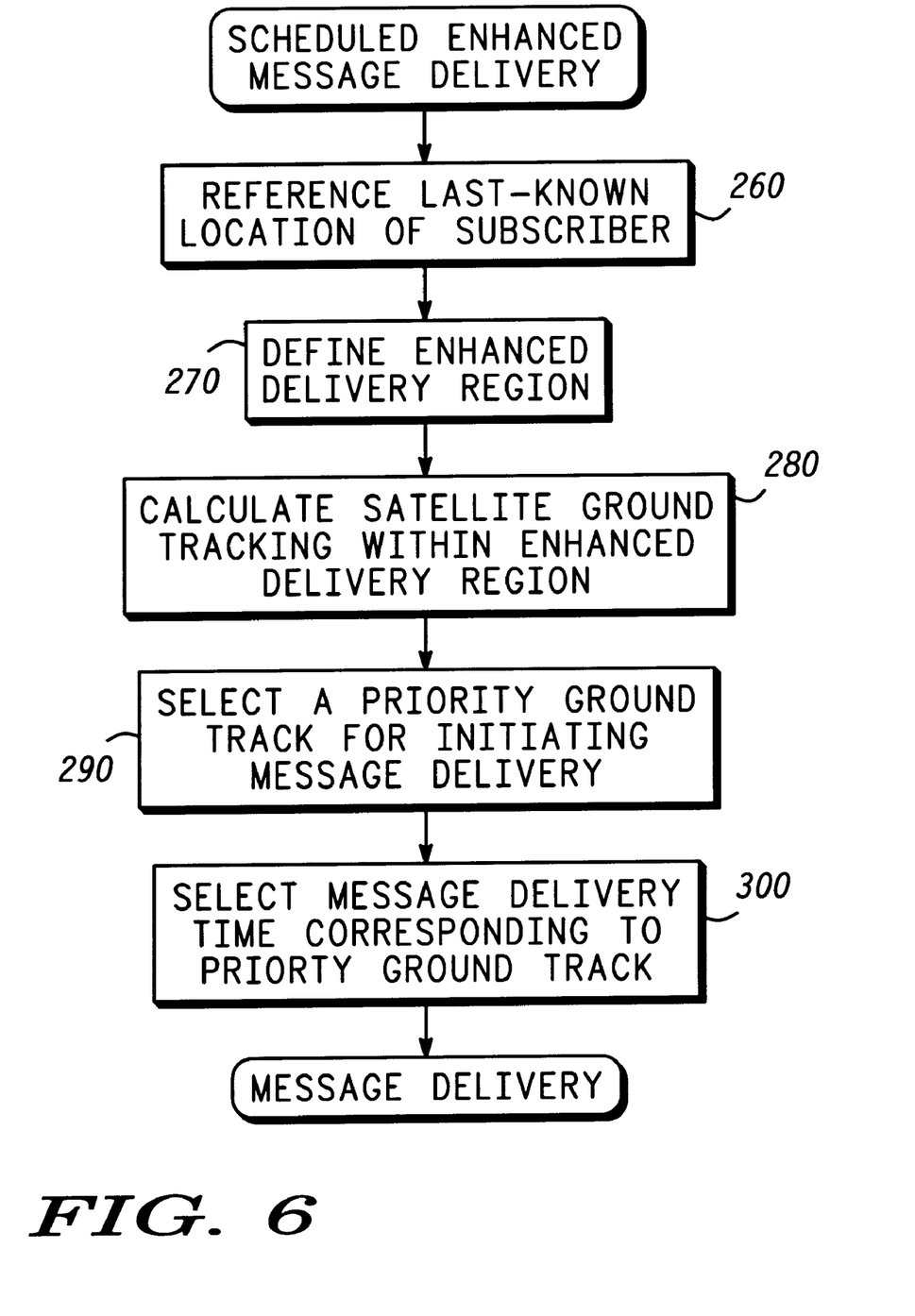
FIG. 6 is a flowchart of deriving an enhanced delivery region, in accordance with the present invention.

FIG. 6 is a flowchart of deriving an enhanced delivery region, in accordance with the present invention. A task 260 uncovers the last-known location of a subscriber having an SU 26 (FIG. 1). Communication system 10 (FIG. 1), either in SCS 28 (FIG. 1) or GW 22, maintains a last-known location for routing communication to regions serviced through a specific satellite 12.

A task 270 utilizes a last-known location and defines an enhanced delivery region about the last-known location of a subscriber. The size of the enhanced delivery region may take on various sizes depending on the sophistication of message control center 27. If known interfering structures are associated with an area near the last-known location of a subscriber then message control center 27 may constrict the size of enhanced delivery region 105 in order to reduce potential interfering structures. When interfering structures are unlikely near a particular last-know location, then the message control center may expand the enhanced delivery region.

A task 280 utilizes orbital mechanics of satellites 12 in orbits 14 (FIG. 1) to generate satellite orbit ground-tracks 141–147 (FIG. 3). When task 280 generates more than one satellite orbit ground-tracks, then a task 290 selects a priority ground-track having adequate or superior characteristics. For example, message control center could select a satellite ground track corresponding to the soonest dispatch of a message, or message control center could select a ground-track having the greatest dwell time within enhanced delivery region 105 (FIG. 3). A task 300 then translates the selected priority ground-track into a corresponding delivery time when satellite 12 will be tracing out the selected priority ground-track.

Figure 7:
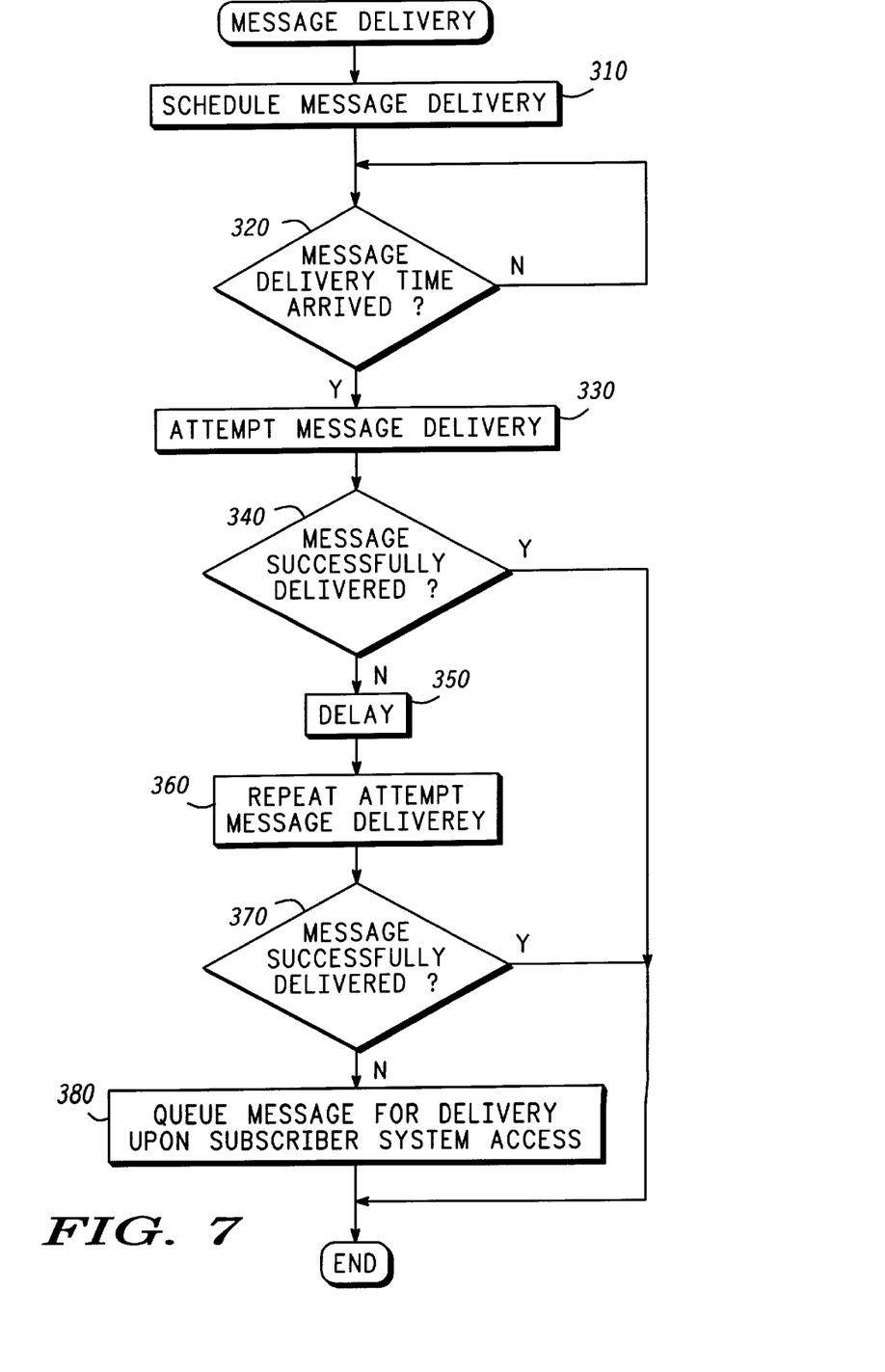
FIG. 7 is a flowchart of a re-attempt at establishing communication with a subscriber for delivery of a message, in accordance with an embodiment of the present invention.

FIG. 7 is a flowchart of a re-attempt at establishing communication with a subscriber for delivery of a message, in accordance with an embodiment of the present invention. A task 310 schedules and queues the message for delivery at the previously determined delivery time.

A query task 320 evaluates the present time with the delivery time and returns back to re-evaluate when the delivery time has not arrived. When query task 320 determines that the delivery time has arrived, a task 330 is performed. Task 330 attempts to establish a communication link between a satellite 12 and an SU 26 (FIG. 1) use in delivering the message.

A query task 340 determines if a communication link was established and the message successfully delivered. If query task 340 determines the message was successfully delivered, then processing terminates. In a preferred embodiment, when query task 340 determines that the message was not successfully delivered, then processing passes to a task 350. A task 350 inserts a time delay before a re-attempt. A time delay of task 350 may, for example, be on the order of seconds or tens of seconds to allow a satellite to advance in its orbit, thus changing the orientation of the communication path between a satellite and an SU 26.

A task 360 then re-attempts to establish a communication link between satellite 12 and an SU 26. A query task 370 determines if a communication link was established during the re-attempt and the message successfully delivered. If query task 370 determines the message was successfully delivered, then processing terminates. In a preferred embodiment, when query task 370 determines that the message was not successfully delivered, then processing passes to a task 380. A task 380 queues the message for delivery to the subscriber upon a subscriber-initiated communication link.

Although the preferred embodiment of the invention has been illustrated, and that form describe in detail, it will be readily apparent to those skilled in the art that various modifications may be made therein without departing from the spirit of the invention or from the scope of the appended claims.

What is claimed is:

1. A method of delivering a message from a caller to a subscriber in a communication system, wherein said caller was unable to communicate with said subscriber during a first configuration of said communication system, said method comprising the steps of:

said communication system receiving said message from said caller;

after an attempt to communicate with said subscriber during said first configuration of said communication system has failed, said communication system referencing a last-know location of said subscriber;

said communication system defining an enhanced delivery region around said last-known location of said subscriber;

said communication system identifying locations of known interfering structures;

said communication system modifying the size of said enhanced delivery region based on said locations of known interfering structures;

calculating at least one delivery window, said at least one delivery window being instances when a second configuration of said communication system are coincident with said enhanced delivery region around said last-known location of said subscriber;

selecting a first delivery time from said at least one delivery window;

said communication system scheduling delivery of said message according to said first delivery time; and said communication system delivering said message as scheduled in said scheduling step during said second configuration of said communication system.

2. A method as recited in claim 1 wherein said selecting step comprises the steps of:

predicting a duration for delivery of said message;

comparing each of said at least one delivery window with said duration; and selecting one of said at least one delivery window that is greater in time than said duration.

3. A method as recited in claim 1 wherein said delivering step further comprises the steps of:

when said message was undeliverable in said delivering step, rescheduling delivery of said message delayed from said first delivery time; and redelivering said message as rescheduled in said rescheduling step.

4. A method as recited in claim 1 further comprising the steps of:

subsequent to said selecting said first delivery time, selecting a second delivery time from said at least one delivery window;

subsequent to said scheduling step, scheduling delivery of said message according to said second delivery time; and subsequent to said delivering step, redelivering said message according to said second delivery time when said message could not be delivered during said first delivery time.

5. A method of calculating a delivery time for dispatching a message into an obstructed environment from a caller to a subscriber in a communication system wherein a satellite delivers said message to said subscriber, said method comprising the steps of:

after an attempt to communicate with said subscriber during a first configuration of said communication system has failed, referencing a last-known location of said subscriber;

defining an enhanced-delivery region around said last-know location of said subscriber;

identifying locations of known interfering structures;

modifying the size of said enhanced delivery region based on said locations of known interfering structures;

calculating at least one delivery window, said at least one delivery window being instances when a ground track of said satellite is coincident with said enhanced delivery region; and selecting a first delivery time from said at least one delivery window.

6. A method as recited in claim 5 wherein said selecting step comprises the steps of:

predicting a duration for delivery of said message;

comparing each of said at least one delivery window with said duration; and selecting one of said at least one delivery window that is greater in time than said duration.

7. A method as recited in claim 5 further comprising the step of:

subsequent to said selecting step, selecting a second delivery time from said at least one delivery window.

* * * * *